March 5, 1935. C. M. WINSOR 1,993,048
AUTOMOBILE BRAKE EQUALIZER
Filed July 29, 1932 2 Sheets-Sheet 1
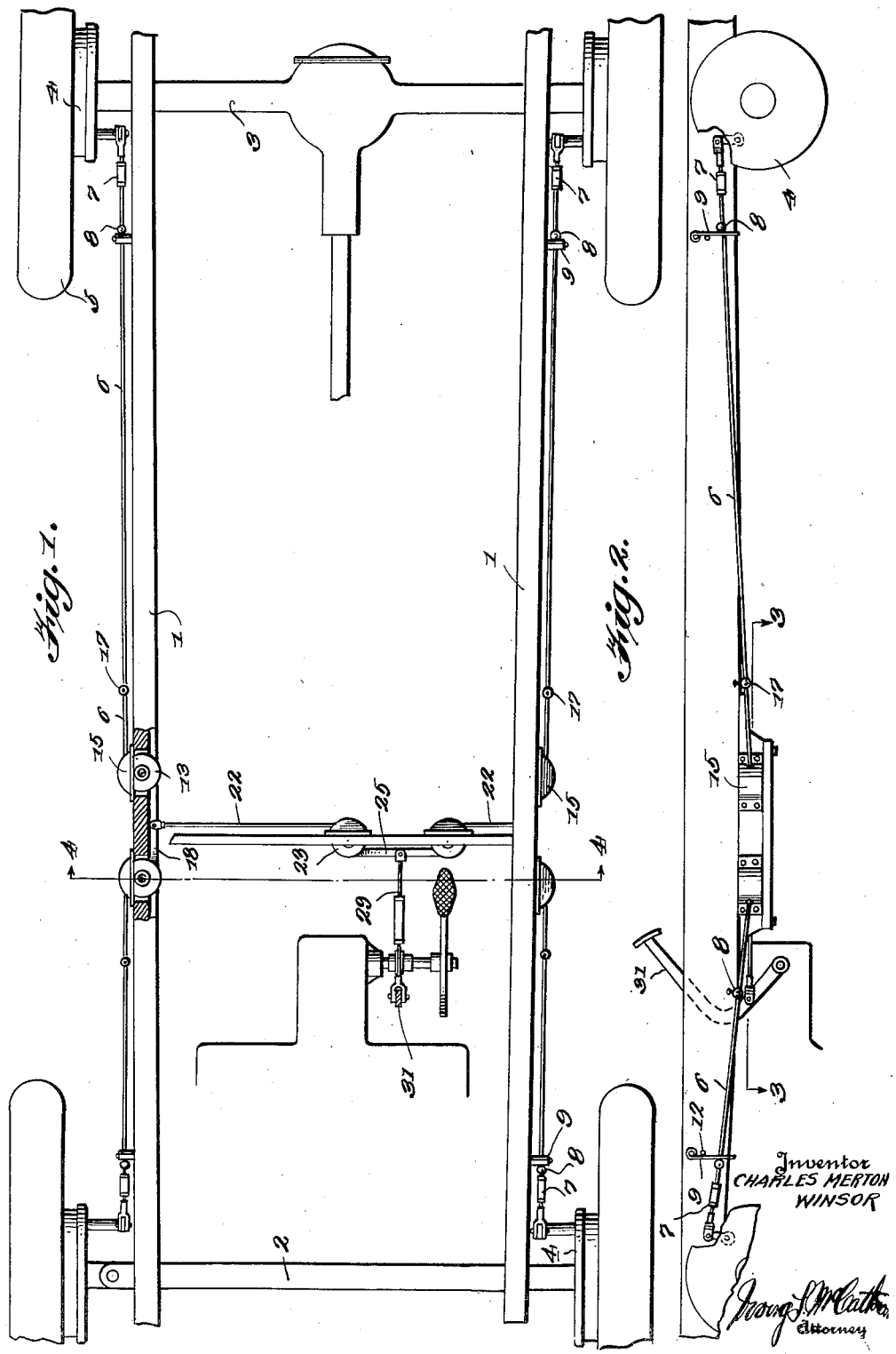

March 5, 1935.　　　C. M. WINSOR　　　1,993,048
AUTOMOBILE BRAKE EQUALIZER
Filed July 29, 1932　　　2 Sheets-Sheet 2
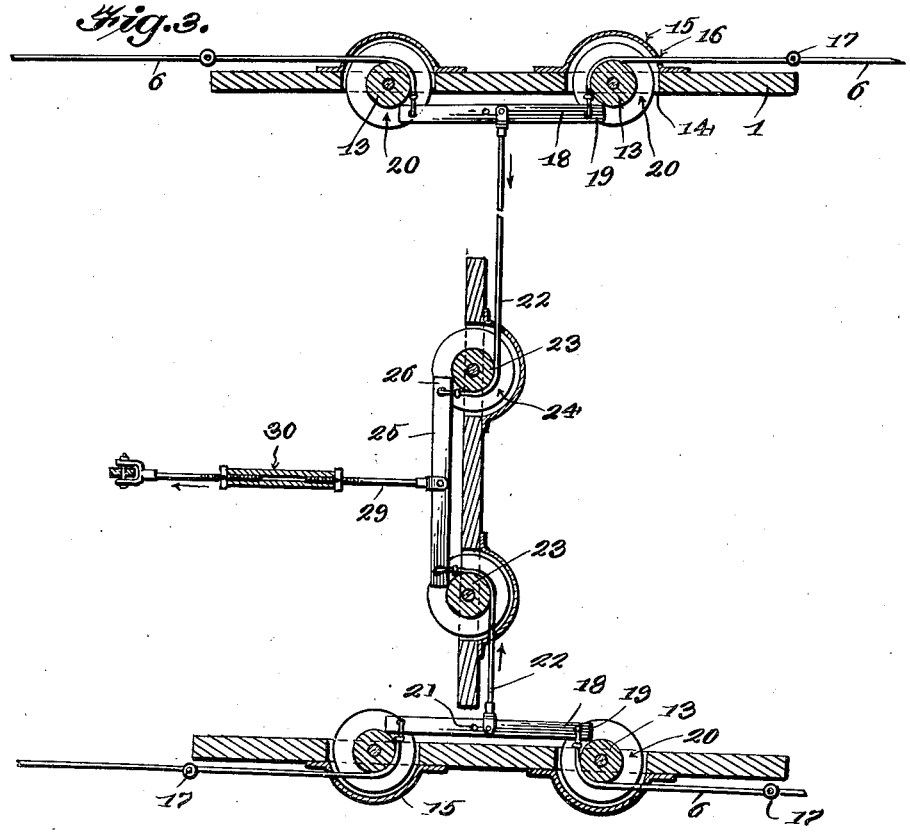
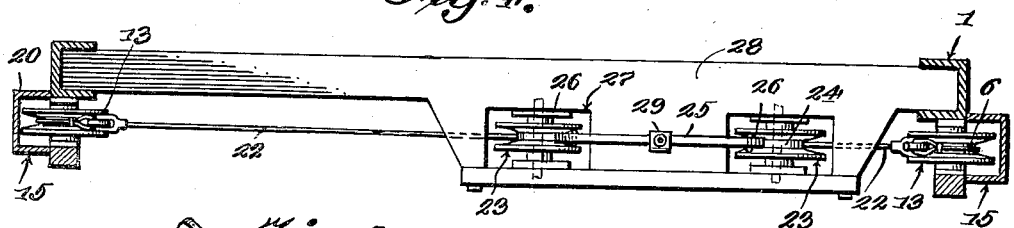
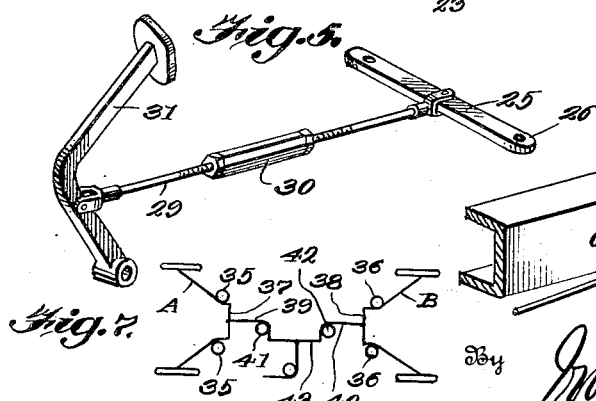
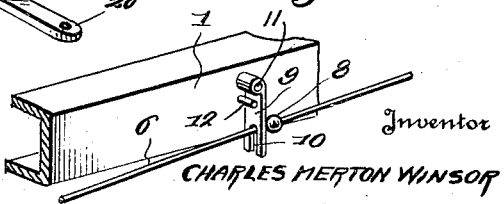
Inventor
CHARLES MERTON WINSOR
By
Attorney Patented Mar. 5, 1935

1,993,048

UNITED STATES PATENT OFFICE 1,993,048

AUTOMOBILE BRAKE EQUALIZER

Charles Merton Winsor, Norwich, N. Y.

Application July 29, 1932, Serial No. 625,863

3 Claims. (Cl. 188—204)

This invention relates to automobile brake equalizers and has for its object the production of a simple and efficient equalizing mechanism which may be attached to the brake rods or cables of a motor vehicle, or other vehicle, in such a manner as to facilitate the equalization of the brakes in such a manner as to cause an equal pull to be exerted upon each brake.

Another object of this invention is the production of a simple and efficient arrangement of equalizers so connected as to snugly fit under the body of the vehicle so as to be conveniently carried by the chassis thereof and at the same time efficiently operate the brake.

A still further object of this invention is the production of a simple and efficient brake equalizing means, wherein the equalizers will be snugly held within the guiding pulleys as soon as the brake pedal is released, thereby firmly holding the various parts under tension and against rattling.

With these and other objects in view, this invention consists in certain novel constructions, combinations and arrangements of parts as will be hereinafter fully described and claimed.

In the drawings:—

Figure 1 is a top plan view of a portion of the chassis of an automobile, certain parts thereof being broken away and shown in section, the improved brake equalizing means being illustrated;

Figure 2 is a side elevation of the structure shown in Figure 1;

Figure 3 is an enlarged horizontal sectional view taken on line 3—3 of Figure 2;

Figure 4 is an enlarged sectional view taken on line 4—4 of Figure 1;

Figure 5 is a detail perspective of the brake pedal and connecting means between the primary equalizer and the pedal;

Figure 6 is a detail perspective view of a portion of the chassis, showing one of the springs which is adapted to hold the pull cable or rod of the brake under a tension, and Figure 7 is a diagrammatic view of the modified form of the invention.

By referring to the drawings, it will be seen that 1 designates the chassis of the automobile which is supported upon the front axle 2, and the rear axle 3. The usual brake drums 4 are carried by the respective wheels 5 and each brake drum is actuated by means of a pull rod or pull cable 6, the same being attached to the brake drum in any suitable or desired manner, and being provided with a suitable take-up 7 to permit of a convenient adjustment of the pull cable or rod 6. The present device may be used in connection with either a two or four-wheel brake system, the present illustration showing a four-wheel brake hook-up. Each cable 6 carries a stop-lug or knob 8 near its outer end, which stop-plug or knob 8 is adapted to normally engage the flat spring 9 which is secured to the side of the chassis 1, as shown in detail in Figure 6, and is provided with a bifurcated end 10 which fits over the cable or rod 6, as clearly shown in detail in Figure 6. The flat spring 9 is secured to the chassis 1 by means of a suitable securing pin or other means 11, and an abutment pin 12 is carried by the chassis to hold the securing pin or screw 11 to limit the swing of the flat spring 9 in one direction and constitute a stop therefor. This flat spring 9 is preferably of resilient material and the pull on the knob or lug 8 carried by the cable or rod 6 will be against the tension of the spring 9, or in the direction of the arrow shown in Figure 6. These springs 9, one being employed for each pull rod or cable 6, will tend to release the brake as soon as the pressure on the foot pedal is released and facilitate the return of the rods or cables 6 to a released position, this being in addition to the usual releasing springs carried by and forming part of the usual brake mechanism.

As shown clearly in detail in Figure 3, each cable 6 is connected to a suitable evener mechanism and each cable 6 upon each side of the chassis passes over a suitable pulley 13 mounted within the notches 14 in the side of the chassis 1. A suitable housing 15 is placed over each pulley 13 to constitute a shield therefor on the outside of the chassis, and a suitable opening 16 is provided through which the cable 6 is adapted to pass. An adjustable stop element 17 is mounted upon each cable 6 to limit the movement of the cable 6 through the housing 15 and over the pulley 13. This stop element 17 will prevent the cable 6 from being disengaged from the pulley should the cable break at a point beyond the pulley or between the pulley and the brake drum.

As shown in Figure 3, two pulleys 13 are arranged upon each side of the chassis and the pulleys on each side of the chassis are arranged in spaced relation. The forward cable for the forward brake passes over one pulley and the rear cable passes over the other pulley. These cables are then connected to an evener bar 18, which is of sufficient length to span the distance between the two pulleys 13 and have the end 19 of the evener bar 18 fit within the grooves 20 of the pulleys 13 when the cables 6 are in a retracted position. The tension on the cables 6 will then hold the evener bars 18 firmly within the grooves of the pulleys 13 and these bars will then be firmly held against rattling. As shown in Figure 3, a bar 18 is carried upon each side of the chassis for controlling the operation of the brakes upon each side of the chassis. Each evener bar 18 is provided with a plurality of apertures 21 for the purpose of permitting a proper adjustment to be made for allowing the pull cable 22 to be adjusted thereto and provide proper adjusted pull upon the evener bars. Each bar 18 is connected to a pull cable 22, as shown, and each cable 22 passes over a pulley 23, there being provided a pair of these pulleys 23, one pulley supporting the pull cable 22 for each side of the chassis. Each pulley 23 is provided with a groove 24 within which the cables 22 pass, and the primary equalizer bar 25 is connected to the extreme end of each cable 22, constituting a connection therefor. This evener bar 25 is of sufficient length to span the distance between the pulleys 23 which are arranged in spaced relation and the ends 26 of this primary evener bar 25 are adapted to fit snugly within the grooves 24 of the pulleys 23 when the brakes are in a retracted position or released position. The pulleys 23 are mounted within the cut-out portion 27 formed within the transverse hanger bar 28 carried by the chassis. This primary evener bar or equalizer bar 25 is connected to a brake rod 29 which brake rod 29 is provided with a suitable take-up 30 and the forward end of this brake rod 29 is connected to the brake pedal 31, as shown in detail in Figure 5.

It should be understood that the device is self adjusting at all times in view of the fact that the slack, if any, may be taken up by adjusting the flexible elements until the bars retain their proper position.

As shown in Figure 7, a different arrangement of equalizers is illustrated. In this structure front and rear brakes are connected to cables A and B passing over suitable pulleys 35 and 36, respectively. The cables A are connected to an equalizer 37, and the cables B are connected to an equalizer 38. These equalizers 37 and 38 are connected to pull cables 39 and 40, respectively, passing over pulleys 41 and 42. The cables 39 and 40 are connected to an equalizer 43 which in turn is operated by means of a pull cable 44 passing over a pulley 45.

From the foregoing description, it will be seen that a very simple and efficient brake control and equalizing means has been provided in that the forward and rear brakes may be conveniently connected together, all of the brakes being operated through a suitable evener or equalizing connection between the brake pedal and the brakes. Furthermore, it should be understood that a proper adjustment may be made through the medium of the take-ups 7 and 30, previously described, thereby avoiding the necessity of the complicated adjusting procedure which is now commonly used.

Furthermore, it should be understood that a very simple and efficient equalizing system has been provided through the medium of the equalizer bars 18 which extend longitudinally of the chassis, and the transversely extending equalizing bar 25 which extends transversely of the chassis, these bars being connected by means of flexible cables, or other means, which cables pass over suitable pulleys, the pulleys being provided with grooves for the purpose of receiving the ends of the equalizing bars and in this way holding the bars against rattling and holding the various parts under tension.

It should be understood that certain detail changes in the mechanical construction may be employed without departing from the spirit of the invention, so long as these changes fall within the scope of the appended claims.

Having described the invention what is claimed as new is:—

1. A brake equalizing mechanism of the class described comprising a plurality of flexible pull elements, a plurality of spaced guiding pulleys for receiving said pull elements, an evener bar connecting said pull elements and spanning the distance between said pulleys, the ends of said evener bar being adapted to fit within the grooves of said pulleys whereby said evener bar will be held against rattling, and an operating means for pulling upon said evener bar.

2. A brake equalizing mechanism of the class described comprising a plurality of pull elements, take-up means mounted within the length of each pull element for adjusting the length thereof, a plurality of spaced pulleys, each pulley being provided with a pull element receiving groove, an equalizing lever connecting the adjacent pull elements, said equalizing lever spanning the distance between said pulleys and having its ends adapted to register within the grooves of said pulleys when pressure is released upon said equalizing bar, and pulling means connected to said equalizing bar.

3. A brake equalizing mechanism of the class described comprising a plurality of flexible pull elements, a plurality of spaced guiding pulleys over which said pull elements are trained, an evener bar connecting said pull elements and spanning the distance between said pulleys, means for actuating said pull elements, and tension means for normally holding said evener bar firmly in contact with said pulleys whereby said evener bar will be held against rattling.

CHARLES MERTON WINSOR.